(12) United States Patent
Clanton et al.

(10) Patent No.: US 11,514,670 B2
(45) Date of Patent: Nov. 29, 2022

(54) QUANTITATIVE GEOSPATIAL ANALYTICS OF DEVICE LOCATION DATA

(71) Applicants: Christian Clanton, Palo Alto, CA (US); Hadley Johnson, San Diego, CA (US); Javier Barreiro, Palo Alto, CA (US); Praveen Seluka, Palo Alto, CA (US); Steven Watson, Palo Alto, CA (US)

(72) Inventors: Christian Clanton, Palo Alto, CA (US); Hadley Johnson, San Diego, CA (US); Javier Barreiro, Palo Alto, CA (US); Praveen Seluka, Palo Alto, CA (US); Steven Watson, Palo Alto, CA (US)

(73) Assignee: Orbital Insight, Inc., Palo Alto, CA (US)

( * ) Notice: Subject to any disclaimer, the term of this patent is extended or adjusted under 35 U.S.C. 154(b) by 148 days.

(21) Appl. No.: 16/803,994

(22) Filed: Feb. 27, 2020

(65) Prior Publication Data
US 2020/0280817 A1  Sep. 3, 2020

Related U.S. Application Data

(60) Provisional application No. 62/811,699, filed on Feb. 28, 2019.

(51) Int. Cl.
*G06V 20/13* (2022.01)
*G06F 16/909* (2019.01)
(Continued)

(52) U.S. Cl.
CPC ............ *G06V 20/13* (2022.01); *G06F 16/909* (2019.01); *G06V 10/255* (2022.01); *H04W 4/021* (2013.01);
(Continued)

(58) Field of Classification Search
CPC ............... H04L 41/142; H04L 41/5009; H04L 41/5035; H04L 41/5067; H04L 43/04;
(Continued)

(56) References Cited

U.S. PATENT DOCUMENTS

| 8,620,686 | B1 | 12/2013 | Reinecke et al. |
| 10,796,320 | B2 * | 10/2020 | Ghosh ..................... H04W 4/02 |

(Continued)

FOREIGN PATENT DOCUMENTS

| CN | 104778836 A | 7/2015 |
| JP | 2015-165428 A | 9/2015 |

(Continued)

OTHER PUBLICATIONS

PCT International Search Report and Written Opinion, PCT Application No. PCT/US2020/020507, dated May 20, 2020, 11 pages.

(Continued)

*Primary Examiner* — Charles N Appiah
*Assistant Examiner* — Nicole M Louis-Fils
(74) *Attorney, Agent, or Firm* — Fenwick & West LLP

(57) ABSTRACT

A method comprises receiving an area of interest (AOI) selection. The method further comprises accessing an AOI device location data for the AOI, the AOI device location data indicating locations of devices over time received within the AOI. The AOI device location data is filtered to only include the device location data that match one or more characteristics. A proximity zone is determined for the for the AOI that includes the area of the AOI. A zone device location data for the proximity zone is determined, which indicates locations of devices over time reported within the proximity zone. The method further comprises normalizing the filtered AOI device location data by computing a ratio of the filtered AOI device location data and the zone device location data to generate an AOI user estimate, and trans- (Continued)

mitting the AOI user estimate to a client device of a requestor.

22 Claims, 6 Drawing Sheets

(51) Int. Cl.
    *H04W 4/02*          (2018.01)
    *H04W 4/021*        (2018.01)
    *H04W 36/24*        (2009.01)
    *H04W 36/32*        (2009.01)
    *H04W 60/04*        (2009.01)
    *G06V 10/20*         (2022.01)

(52) U.S. Cl.
    CPC ......... *H04W 4/023* (2013.01); *H04W 36/245* (2013.01); *H04W 36/32* (2013.01); *H04W 60/04* (2013.01)

(58) Field of Classification Search
    CPC ............... G06F 16/909; G06K 9/0063; G06K 9/00637; G06K 9/00771; G06K 9/3216; G06K 9/3241; H04W 36/245; H04W 36/32; H04W 4/02; H04W 4/021; H04W 4/023; H04W 4/029; H04W 4/38; H04W 4/80; H04W 60/04
    USPC ........................................................ 455/456
    See application file for complete search history.

(56) References Cited

U.S. PATENT DOCUMENTS

| | | | |
|---|---|---|---|
| 2004/0117358 A1 | 6/2004 | von Kaenel et al. | |
| 2008/0248815 A1* | 10/2008 | Busch | G06Q 20/3224 455/456.5 |
| 2011/0151839 A1 | 6/2011 | Bolon et al. | |
| 2011/0320319 A1 | 12/2011 | Streich | |
| 2013/0176433 A1 | 7/2013 | Terada et al. | |
| 2014/0270355 A1 | 9/2014 | Terrazas et al. | |
| 2014/0316616 A1 | 10/2014 | Kugelmass | |
| 2015/0230053 A1* | 8/2015 | Scellato | G01S 5/0252 455/456.3 |
| 2016/0366152 A1* | 12/2016 | Jackson | H04W 4/21 |
| 2017/0250751 A1 | 8/2017 | Kargieman et al. | |
| 2017/0293800 A1 | 10/2017 | Babenko et al. | |
| 2017/0311131 A1 | 10/2017 | South et al. | |
| 2018/0053401 A1 | 2/2018 | Martin et al. | |
| 2018/0096595 A1 | 4/2018 | Janzen et al. | |
| 2018/0293249 A1* | 10/2018 | Tabares | G06Q 30/0203 |
| 2020/0065840 A1* | 2/2020 | Pinel | H04W 4/021 |

FOREIGN PATENT DOCUMENTS

| | | |
|---|---|---|
| JP | 2015-207041 A | 11/2015 |
| JP | 2017-146771 A | 8/2017 |
| WO | WO 2018/038720 A1 | 3/2018 |

OTHER PUBLICATIONS

PCT International Search Report and Written Opinion, PCT Application No. PCT/US2020/020470, dated Jun. 18, 2020, 16 pages.
United States Office Action, U.S. Appl. No. 16/410,435, dated Oct. 27, 2020, nine pages.
Japan Patent Office, Official Notice of Rejection, Japanese Patent Application 2021-550206, dated Feb. 15, 2022, six pages.
Saito, M. et al., "A Proposal of Vehicle Driving Volume Estimation Method using Spatial Statistics Data," IPSJ SIG Technical Report, 2018 Information Processing Society of Japan, May 17, 2018, vol. 2018-DPS-175, No. 27, 12 pages (with Google Machine Translation).

* cited by examiner

| utc_timestamp | ad_id | id_type | geo_hash | latitude | longitude | horizontal_accuracy | app_id |
|---|---|---|---|---|---|---|---|
| 1575243670 | 01a47d41-a6a4-4d76-ab07-19a7b4a7d9b8 | idfa | xn0m7m3kg | 34.702531 | 135.496262 | 65 | e4dd0908ddf2ae644046613fc5 4ca6942bc2e6cff78be175d428 |
| 1575277059 | 0037a8ab-c188-4ef6-8185-3b0a39a00ac6 | idfa | xn77h0v4v | 35.6882 | 139.7532 | 9 | f3714bdf06f44957b80e855922 4ac384f36a586006f698b194836 |
| 1575087568 | 013583d6-7282-4449-8558-beee5c3d8aab | idfa | xn76ux82k | 35.680908 | 139.768589 | 10 | 47e699198b4d58d5e06104a25 cf978573 69c61b2a471734bc9e |
| 1575194363 | 00bd5d73-f037-4fd6-9acf-a4a1b79a1151 | aaid | xn76urq3g | 35.679777 | 139.765792 | 28 | 8bb9330d40c9b3d3818b11eb1 daacbf44551a66d943f46cc6b4 |
| 1575283524 | 0248853a-b98d-465b-abdc-bdc7703b3d8a | aaid | xn76urwyk | 35.681934 | 139.766528 | 16 | 8bb9330d40c9b3d3818b11eb1 daacbf44551a66d943f46cc6b4 |
| 1575283529 | 0248853a-b98d-465b-abdc-bdc7703b3d8a | aaid | xn76urwyk | 35.681934 | 139.766528 | 16 | 8bb9330d40c9b3d3818b11eb1 daacbf44551a66d943f46cc6b4 |
| 1575283540 | 0248853a-b98d-465b-abdc-bdc7703b3d8a | aaid | xn76urwyk | 35.681934 | 139.766528 | 16 | 8bb9330d40c9b3d3818b11eb1 daacbf44551a66d943f46cc6b4 |
| 1575283545 | 0248853a-b98d-465b-abdc-bdc7703b3d8a | aaid | xn76urwyk | 35.681934 | 139.766528 | 16 | 8bb9330d40c9b3d3818b11eb1 daacbf44551a66d943f46cc6b4 |
| 1575283553 | 0248853a-b98d-465b-abdc-bdc7703b3d8a | aaid | xn76urwyk | 35.681934 | 139.766528 | 16 | 8bb9330d40c9b3d3818b11eb1 daacbf44551a66d943f46cc6b4 |

FIG. 3B

Timestamp 340, Device ID 345, OS ID 350, Geo Hash 355, Geo. Coordinates 360, Accuracy 365, App/Provider ID 370

QUANTITATIVE GEOSPATIAL ANALYTICS OF DEVICE LOCATION DATA

CROSS-REFERENCE TO RELATED APPLICATIONS

This application claims priority to U.S. Provisional Application No. 62/811,699, filed on Feb. 28, 2019, which is hereby incorporated by reference in its entirety.

TECHNICAL FIELD

This disclosure relates generally to processing of sensor data, and, in particular, to quantitative geospatial analytics of device location data.

BACKGROUND

The ability to estimate or predict the number of users at an area of interest (AOI) may be a valuable resource in many scenarios. For example, knowing the number of users over time for a retail location may assist a company in determining the popularity of that location relative to other commonly owned locations. As another example, the traffic patterns of users in a city may assist city planners in developing new infrastructure and in developing emergency response plans.

Multiple methods may be used to determine a population size at a target AOI. A simple approach may simply be to visit a location and count each of the objects of interest at the location. However, this quickly poses a logistical issue when more than a few estimates are needed, and when the size of the AOI, and the number of objects is large. Instead, sensor data of the AOI, such as device location data, may be used to estimate a population. This sensor data can be used to gather information used to estimate the population at the target AOI without an on-location component.

This sensor data may depend on a set of third party providers, which have agreements with a network of original sources, such as vehicle manufacturers who have location providers on their vehicles, applications creators who have applications installed on smartphones with location capabilities, mobile carriers, satellite providers, and so on. The number of original sources or providers that have agreements with the third party providers, and the number of sensor data sources that may happen to be at a given AOI, may change irrespective of the actual changes of the number of users at the AOI. Thus, the sensor data may be inaccurate. Therefore, what is lacking is a method of generating accurate predictions of the number of users at an AOI using sensor data gathered from these providers.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

Figure (FIG. 1 illustrates an example system for estimating a number users in an area of interest (AOI), in accordance with an embodiment.

FIG. 3B illustrates an example of data that may be collected by the AOI user analyzer system and provided to a requestor for an AOI, in accordance with an embodiment.

DETAILED DESCRIPTION

The Figures (FIGs.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Disclosed by way of example embodiments are a method and system for determining an estimate of a number of users at an area of interest (AOI) by analyzing device location data for an AOI and a larger surrounding proximity zone area.

In one example embodiment, the method comprises receiving an area of interest (AOI) selection. The method further comprises accessing an AOI device location data for the AOI, the AOI device location data indicating locations of devices over time received within the AOI. The AOI device location data is filtered to only include the device location data that match one or more characteristics. A proximity zone is determined for the AOI that includes within it the area of the AOI. A zone device location data for the proximity zone is identified, which indicates locations of devices over time reported within the proximity zone. The method further comprises normalizing the filtered AOI device location data by computing a ratio of the filtered AOI device location data and the zone device location data to generate an AOI user estimate, and transmitting the AOI user estimate to a client device of a requestor.

Example System Environment

Figure 1:
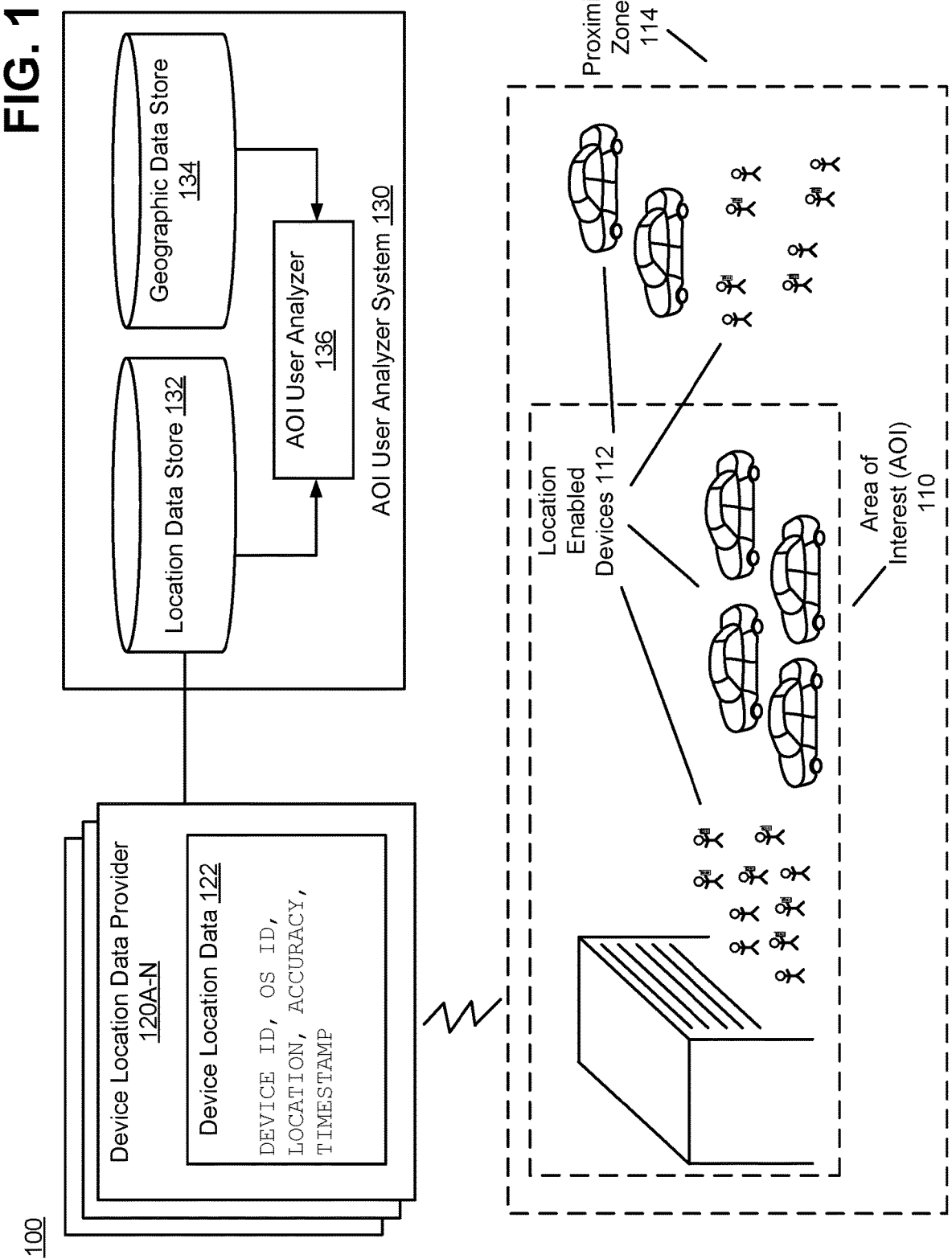

Figure (FIG. 1 illustrates an example system for joint modeling of object population estimation using sensor data and distributed device data, in accordance with an embodiment. The example system environment shown in FIG. 1 may include an area of interest (AOI) 110 with location enabled devices 112, a proximity zone 114, device location data providers 120A-N (generally referred to as 120 herein), and an AOI user analyzer system 130 with location data 132, geographic data 134, and an AOI user analyzer 136.

The area of interest (AOI) 110 is an area on a land surface (e.g., the surface of the Earth), and include all features (natural and man-made) within that area. The definition of the AOI may be provided by a user or third party system 130 to the AOI user analyzer system 130, e.g., by using an application programming interface (API) or graphical user interface (GUI). The AOI 110 may be defined by a closed boundary on the land surface. The closed boundary itself may be defined using various connected geographic markers, which may be indicated using geographic coordinates, such as longitude and latitude indicators. Alternatively, the AOI 110 may be defined by a set of vectors describing the closed boundary. In some cases, the AOI 110 may be defined using multiple closed boundaries, with each closed boundary defined using one of the methods noted above. The AOI 110 may also have within one of its closed boundaries an excluded area or areas. These excluded areas may also be defined using closed boundaries and are specified in a similar fashion. In another embodiment, the AOI 110 is defined using a cartographical indicator, i.e., a commonly, conventionally, administratively, or legally agreed upon indicator of a bounded area on a land surface. For example, these cartographic indicators may include a point of interest, landmark, address, postal code, city/town/village, metropolitan area, country, province/county, neighborhood, unincorporated area, and so on, plus or minus a tolerance area beyond (or within) the cartographic indicators, which may be defined in absolute or percentage from the cartographic indicators. For example, the AOI 110 may be indicated using a postal code, which is defined by a postal service of a country.

The AOI 110 represents a geographic location for which information, such as a population estimate or activity of users within the AOI 110, is of interest to a requesting party. For example, a municipal government may be interested in an amount of foot traffic at a public transit station over time to determine how to plan for future public transportation infrastructure developments. Other examples of AOIs 110 may include shopping malls, airports, neighborhoods, schools, factories, oil refineries, automotive or other vehicle manufacturing facilities (e.g., recreational vehicles, aircraft), mines, retail locations, warehouses, and so on. The AOI 110 may further be bounded by an upper elevation and/or lower elevation limit.

In one embodiment, the AOI 110 is not a location on the land surface, but a closed three-dimensional volume at any location, which may or may not be offset from the ground level. It may be defined using a plurality of three dimensional coordinates which are connected together using planar surfaces, or may be described in terms of geometric shapes.

The AOI 110 includes one or more location enabled devices 112. Each location enabled device 112 is a device that may be able to gather or identify or have reported location information of the device and transmit it via a network (e.g., a mobile, cellular, wireless, or other network) to an external system, such as the device location data providers 120, which are further described below. Examples of location enabled device 112 include smartphones, tablets, smart watches, navigation units on vehicles, waterborne vessels, GPS trackers, laptops, etc. The location information may be gathered using a component of the mobile device capable of receiving information from GPS or similar satellite navigation system (e.g., GLONASS, Galileo, Beidou), or may be gathered using other methods of approximating location, such as via detection of nearby Wi-Fi networks or cellular network towers. A mobile device may be associated with a user (or more than one user). It may be a device carried or worn by the user. In this respect it may serve as a proxy for the user and provide information about the user, and in particular the location information of that user. Therefore, by receiving mobile device usage data that includes location information, the current location of an associated user may also be inferred at a point in time. In one embodiment, a mobile device may also be referred to as a device.

The location enabled device 112 may transmit location data information regarding the current geographic location of the mobile device and the current time (e.g., local time or universal time/GMT) to the device location data providers 120. The geographic location may be indicated using geographic coordinates, e.g., latitude, longitude, and/or altitude data, nearby Wi-Fi network names, nearby cellular tower locations, or other methods, such as those used to define the AOI 110 as described above. For example, the geographic location may be indicated as a point of interest at which the mobile device is located. The current time may be indicated in varying levels of accuracy, e.g., millisecond, second, minute, or day level of accuracy. For example, the current time may be indicated in a 64-bit integer using the Unix time format.

The location enabled device 112 may transmit additional information in the location data information, such as an identifier of the user account that is logged into the mobile device, a mobile provider information, a mobile application which gathered the location data for the location enabled device 112, historical geographic location information, operating system information, version number information, an identifier of the application that provided the location information, an accuracy level, and so on.

The space (i.e., the area, location, volume, etc.) defined by the AOI 110 may be inclusive, or approximately inclusive, within a proximity zone 114. The proximity zone 114 is a space that may be defined in the same fashion as the AOI 110. Thus, the proximity zone 114 may be defined as a geographic area, geographic location or point of interest, or a three dimensional space. In one embodiment, the type of definition of the proximity zone 114 matches that of the AOI 110.

The space defined by the proximity zone 114 may include all points in space defined by the definition of the AOI 110. In addition, the proximity zone 114 also defines spaces which are not within the AOI 110. Thus, the proximity zone 114 includes the AOI 110, but also includes areas, locations, and/or volumes that are outside the space defined by the AOI 110. This additional space may be determined based on the of the AOI 110, or the location reported by the location enabled devices 112 within the AOI 110.

In the first case, the proximity zone 114 may be determined, e.g., by the AOI user analyzer system 130, based on the location of the AOI 110. The proximity zone 114 may be defined as including the AOI 110, as well as an amount of space that is a predetermined distance from the boundaries defined by the AOI 110.

In the second case, the proximity zone 114 may be determined, e.g., by the AOI user analyzer system 130, based on the location of the location enabled devices 112 within the AOI 110. The AOI user analyzer system 130 may determine, at one point, the location enabled devices 112 that have reported a location within the AOI 110. The AOI user analyzer system 130 further determines the home location of these reported devices within the AOI 110, e.g., by determining the location of these devices at night (which may be the location reported over a certain number of repeated hours/nights). The AOI user analyzer system 130 may determine the proximity zone 114 as the area that includes a percentage of the home locations of those reported devices with home locations that are closest to the AOI 110. The boundary of the proximity zone 114 may be continuous, i.e., not disjoint, and may encompass the geographic coordinates of the home locations reported by the reported devices within the AOI. The area of the proximity zone 114 may be determined such that it is the smallest area possible while encompassing all the home locations.

Additional details regarding the determination of the proximity zone 114 are described below with reference to FIG. 2.

Although both the AOI 110 and the proximity zone 114 are shown as bounded by rectangular dotted lines in FIG. 1 for illustrative purposes, as described above, they may be defined using a variety of methods and may not correspond to rectangular boxes as shown. This may be indicated graphically or textually.

The device location data providers 120 receive location data information from the location enabled devices 112. This information may be stored as the device location data 122, and may be transmitted in whole or in part (e.g., excluding personally identifiable information) to the AOI user analyzer system 130. Each device location data provider 120 may be associated with location data information from a specific application, device manufacturer, device operating system, or other entity which gathers the location data information from a subset of all mobile devices. For example, a first set of location enabled devices 112 has installed thereupon an application A, which transmits location data information to a device location data provider 125A, while a second set of location enabled devices 112 (which may overlap with the first set) has installed thereupon an application B, which transmits location data information to a separate device location data provider 125B. The application on the location enabled device 112 may transmit the location data information by accessing one or more APIs of an operating system of the mobile device in order to access a data transmission mode that allows the application to transmit the location data information across a network, e.g., via cellular data transmission, Wi-Fi data transmission, Bluetooth data transmission, or any other network transmission technology, to a device location data provider 120, and more specifically, to one or more network servers of the device location data provider 120. The location data information can include the location data of the location enabled device 112, which the application may access by using an API of the operating system of the mobile device as well. While the provider of the application and the device location data provider 120 may be the same entity, in some cases these entities are separate, with the application provider sending the location data of the mobile devices to the device location data provider 120 for collection.

After processing the location data information, the device location data providers 120 transmits the device location data 122 to the population estimation system 135. In one embodiment, the device location data 122 include, for each reported location data information: 1) a timestamp, 2) device identifier, and 3) geographic coordinates. In addition, the device location data 122 may include: 4) an operating system identifier, 4) geo hash, 6) accuracy count, and/or 7) application identifier. Additional details regarding the device location data 122 is described below with reference to FIG. 3B.

The AOI user analyzer system 130 estimates a number of users at the AOI 110 based on the device location data for the AOI 110 and the proximity zone 114. In one embodiment, the AOI user analyzer system 130 includes the location data store 132, geographic data store 134, and the AOI user analyzer 136.

The location data store 132 stores device location data 122 received from the location enabled devices 112 in the AOI 110 and the proximity zone 114. The location data store 132 may also include device location data 122 for other geographic areas, and may include all the device location data 122 that the device location data providers 120 can provide to the AOI user analyzer system 130, such as for an entire country or the entire world. Each entry in the location data store 132 may include an entry of reported location data information from a location enabled device 112.

The geographic data store 134 stores geographic information that the AOI user analyzer system 130 may use to determine the locations of the location enabled devices 112 in the location data store 132 in relation to the AOI 110 and the proximity zone 114. In particular, the AOI user analyzer 136 may use the geographic data store 134 to determine if a reported location from a location enabled device 112 is within the boundaries indicated by the definition of the AOI 110. In one embodiment, the geographic data store 134 may also store information indicating a number of users within different geographic regions. The information in the geographic data store 134 may be retrieved from a third party (e.g., a satellite data provider, government census records, etc.).

The AOI user analyzer 136 estimates a number of users present at the AOI 110 over time (or at a specific point in time) using the device location data 122 reported for the AOI 110 and the proximity zone 114.

To make this estimate, the AOI user analyzer 136, after receiving the definition of the AOI 110, accesses the location data store 132 to retrieve device location data 122 for location enabled devices 112 present at the AOI 110 over a period of time (e.g., the current time, the last hour, last day, last week, last month, etc.). The AOI user analyzer 136 may use the geographic data store 134 to determine the geographic locations/coordinates that are within the boundaries of the AOI 110, and may find those location data entries in the location data store 132 that match those geographic locations and/or coordinates. The AOI user analyzer 136 filters this list of AOI device location data to remove location data of transient devices (e.g., those with a dwell time below a threshold) and of devices that do not match other characteristics, such as being present during a specific (repeating) time period.

The AOI user analyzer 136 further determines the proximity zone 114 for the AOI 110, in the manner described above. As noted, this proximity zone 114 includes the AOI 110 along with an additional space that may surround the AOI 110. The AOI user analyzer 136 determines, using the location data store 132 and the location data store 132, a list of zone device location data which includes device location data 122 from the location data store 132 of devices with locations reported in the proximity zone 114 for the same period of time. The AOI user analyzer 136 may identify these devices using the same method that is used to identify devices that are within the AOI 110.

With both the AOI device location data and the zone device location data, the AOI user analyzer 136 normalizes the filtered AOI device location data to generate a normalized result which is an estimate of a number of users at the AOI. In one embodiment, the normalization of data involves removing systemic errors in reported device location counts due to changes in overall or global reported device location counts that are not limited to reported device location counts within the AOI. As further described below, the purpose of normalizing the filtered AOI device location data is to account for any systemic changes in the device location data 122, which may occur due to changes in the original sources of location data information that are received by the device location data providers 120. Over time, due to changes in agreements, installed userbases of applications, userbases of devices, regional regulations and laws, privacy settings, and so on, the number of device reporting location data information to the device location data providers 120 may change significantly in count. For example, a new application may sign an agreement with a device location data provider 120 to provide location data information. This may significantly increase the device count of location data information for that provider. As another example, a new vehicle may be introduced into the market which provides location data information reporting capabilities. This vehicle may be popular, and thus increase the number of device reporting location data information. Conversely, a device may lower in popularity, or an application may cancel a prior agreement, causing a decrease in the number of device reporting location data information. Thus, certain changes in device location data reported within an AOI 110 may be due to these systemic changes in the number of device reporting data overall rather than changes in devices at the AOI 110 itself.

The AOI user analyzer 136 accounts for these changes by comparing the reported device location data 122 for the filtered AOI device location data with the device location data 122 for the zone device location data. If a change occurs in the filtered AOI device location data that is (proportionally) mirrored in the zone device location data over some period of time, the AOI user analyzer 136 may determine that this change in devices reporting location data is due to an aforementioned systemic change rather than a change specific to the AOI 110. These changes are removed by the AOI user analyzer 136 in this normalization process. In one embodiment, the AOI user analyzer 136 normalizes this data by determining a ratio between the filtered AOI device location data with the zone device location data, and specifically, a ratio between a number of devices reported in the filtered AOI device location data over time versus a number of devices reported in the zone device location data over the same period of time.

After determining the ratio, the AOI user analyzer 136 may apply it to a count of users for the proximity zone 114 to generate an estimate of the number of users at the AOI 110. This count of users (or people) may be determined via demographic information (e.g., census data), and may be stored in the geographic data store 134. The ratio may be computed multiple times, and applied to multiple filtered AOI device location data sets to generate multiple estimates for different time periods, or for a range of time periods. The AOI user analyzer 136 may report this estimate of the number of users at the AOI to a requestor, i.e., the user which requested the estimate and provided the definition of the AOI 110. These estimates may be transmitted to a client device of the requestor to be displayed in a GUI on a display device of the requestor's client device, or provided via an API by the AOI user analyzer 136. Additional details regarding the provided estimates in GUI form are described below with reference to FIGS. 3A-3B.

In addition, the AOI user analyzer 136 may analyze the estimates of the number of users at the AOI 110 for anomalies. The AOI user analyzer 136 may compare the estimates from different times which fall on the same repeating time periods (e.g., same time of day, day of the week, day of the month, month of the year, season, etc.) to determine if a particular estimate diverges significantly (e.g., beyond 40%) from a historical median. The AOI user analyzer 136 may notify the requestor (e.g., via the GUI) of the anomalous estimate, i.e., the estimate that diverges from the historical median.

The AOI user analyzer 136 may also analyze the estimates and compare them to estimates of the same time periods for alternate AOIs to determine a relative difference in estimates between the AOIs. The alternate AOIs may be AOIs of the same type as the AOI 110 (e.g., a competitor). The AOI user analyzer 136 may report this relative difference to the requestor.

In another embodiment, the AOI user analyzer 136 may also determine for an AOI 110 if the filtered AOI device location data includes reports of device location data from the same devices over different (disjoint) periods of time for the AOI, over an overall period of time. This may indicate a revisit, i.e., that the device has been present at the AOI 110 on at least two different occasions. The AOI user analyzer 136 may report this revisit count for the overall period of time to the requestor.

Additional details regarding the AOI user analyzer 136 are described below with reference to FIG. 2.

By using the AOI user analyzer system 130, a requestor can more accurately determine an estimate of users at an AOI 110 from device location data 122 as the device location data 122 is filtered and normalize to remove the effects of systemic changes in the reported device counts, and is filtered to remove devices with characteristics not matching certain filter criteria. This allows for a more accurate estimate of a number of users at an AOI 110 over a period of time. This data can be used to determine, for different types of AOIs, valuable information about the AOI 110. For example, the estimate may be used for a retail location AOI to more accurately determine customer traffic for that AOI. The estimate may be used for a production facility AOI, such as a refinery, vehicle manufacturer, mining facility, aerospace manufacturer, to determine a number of workers at that facility, and by proxy, a production rate for that facility. As the estimate can be generated for multiple time periods, trends and other time-based data can be determined using the estimate. As the device location data is also anonymized, with no personal information shared, the estimates provided by the AOI user analyzer 136 also adhere to privacy regulations, allowing for the sharing of accurate data but not at the expense of revealing personally identifiable information.

Example Block Flow for the AOI User Analyzer System

Figure 2:
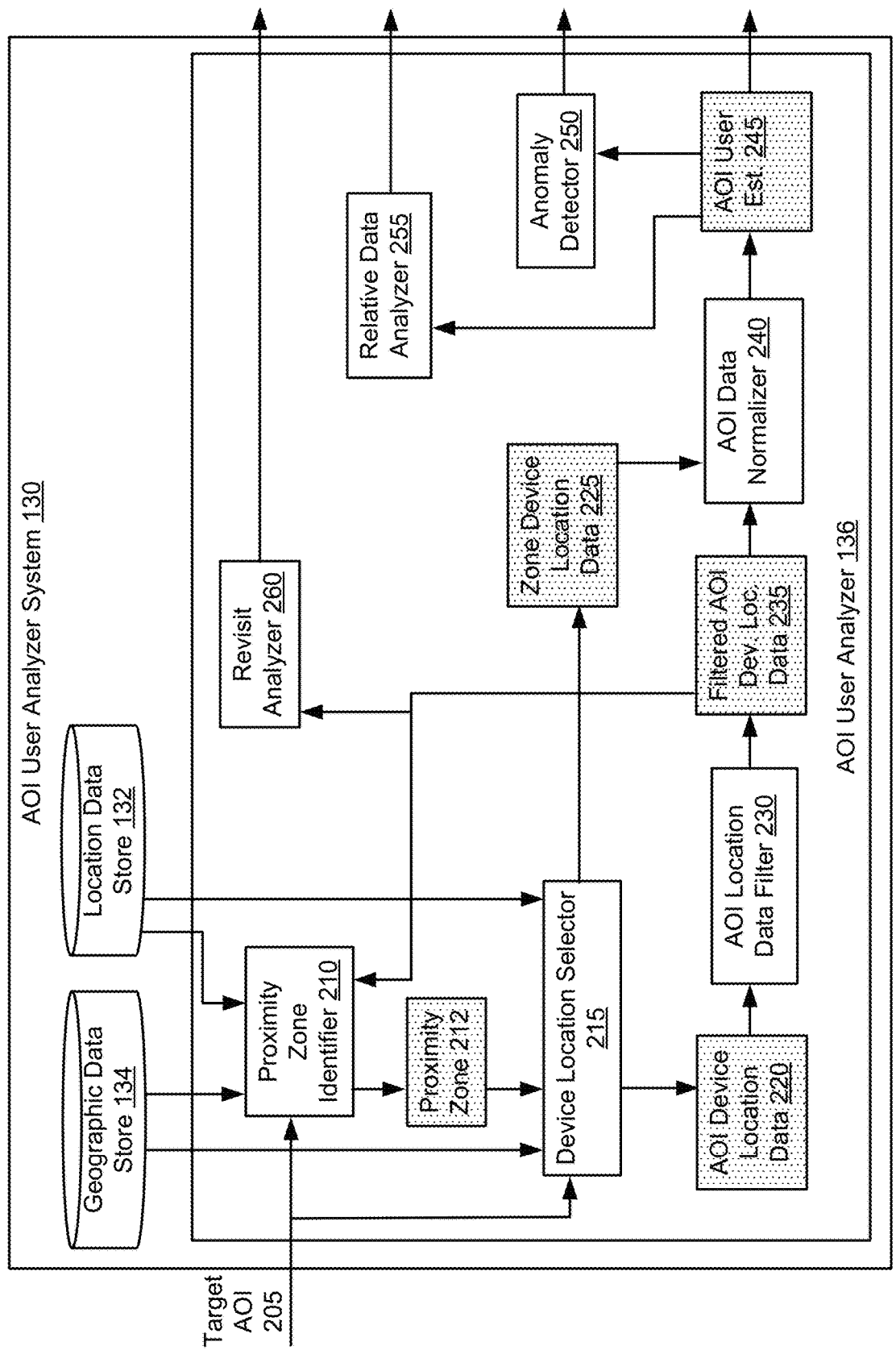
FIG. 2 is a block diagram illustrating an example flow for an AOI user analyzer system for estimating a number of users in an AOI and for analyzing anomalies, revisit information, and relative differences in AOIs, in accordance with an embodiment.

FIG. 2 is a block diagram illustrating an example flow for an AOI user analyzer system for estimating a number of users in an AOI and for analyzing anomalies, revisit information, and relative differences in AOIs, in accordance with an embodiment. FIG. 2 illustrates the process in the AOI user analyzer system 130 for generating the estimate of a number of users in an AOI over time of FIG. 1. As shown, the AOI user analyzer system 130 includes the location data store 132, the geographic data store 134, and the AOI user analyzer 136. The AOI user analyzer 136 includes a proximity zone identifier 210, a device location selector 215 to generate the AOI device location data 220 and the zone location data 225, an device location data filter 230 to generate the filtered AOI device location data 235 and the filtered zone device location data 226, an AOI data normalizer 240 to generate the AOI user estimate 245. The AOI user analyzer 136 may also include an anomaly detector 250, relative data analyzer 255, and a revisit analyzer 260.

The proximity zone identifier 210 receives the definition of the target AOI 205 and determines the proximity zone 212 for this target AOI. The proximity zone identifier 210 may determine the proximity zone 212 based on expanding the boundaries of the target AOI 205 or based on the home locations of devices determined to be within the AOI 205. The proximity zone identifier 210 may determine the geographic coordinates of boundaries using the geographic data store 134.

To determine the proximity zone 212 based on expanding the boundaries of the AOI 205, the proximity zone identifier 210 may take the boundaries of the AOI 205 (as defined in one of the manners described above), and extend that boundary a prescribed distance in a direction perpendicular (i.e., normal) to the boundary lines themselves. This could be achieved by drawing (imaginary) lines of the prescribed distance normal to the boundary lines defined for the AOI at certain intervals along the boundary lines, and connecting the endpoints of these lines to form the expanded boundary for the proximity zone 212. Another option would be to expand the lengths of the boundary lines for the AOI 205 by a scale factor, while preserving the angles between the boundary lines. If the boundary lines contain any curved surfaces, these would also be increased in length, while preserving the degree of curvature. The scale factor could be determined as a predetermined value, or could be set such that the resulting boundary lines have a distance from the boundary lines of the AOI 205 of the prescribed distance for all the boundary lines of the AOI 205. The prescribed distance may be fixed (e.g., 100 km), or may be determined based on how many devices report locations within the boundaries of the proximity zone. The distance may be extended until a threshold number of devices report locations within that proximity zone or may be based on landmarks within the AOI.

To determine the boundary lines of the proximity zone 212 using home locations of devices within the AOI 205, the proximity zone identifier 210 receives the filtered AOI device location data 235 generated by the device location data filter 230 from the AOI device location data 220. The filtered AOI device location data 235 indicates a number of devices within the AOI 205 over a period of time (as further described below). The proximity zone identifier 210 determines the home locations for the devices which are reported within the filtered AOI device location data 235. The home locations for these devices may be the locations which these devices report during home or non-business hours, e.g., nighttime from midnight to 5 am. The proximity zone identifier 210 may process a ranking of these home locations based on distance to the AOI 205 (e.g., to a boundary of the AOI or to a midpoint of the AOI). For example, a home location that is closer in the distance to the AOI may be ranked higher. The proximity zone identifier 210 may select a number of home locations which are closest to the AOI 205, i.e., the proximity zone identifier 210 may select a number of highest ranked home locations. This number may be a percentage of the total number of home locations in the list of determined home locations (e.g., 80%). Alternatively, the proximity zone identifier 210 may select from the ranked list all home locations that are within a certain distance of the AOI. The proximity zone identifier 210 forms a boundary around these selected home locations and uses this boundary as the definition of the proximity zone 212. This boundary may be formed by connecting the outermost selected home locations such that a closed boundary is formed around all selected home locations. The boundary may curved such that it has no angles or verticies. The boundary may also be in the shape of the AOI 205 but scaled such that the selected home locations are within the boundary. The boundary may be a regular shape (e.g., a circle, square) which is centered at the AOI 205 and which is orientated and sized to include all the selected AOIs.

In other embodiments, the selected home locations may be randomly selected from the list of home locations. In some cases, selected home locations may be selected not from the devices of the filtered AOI device location data 235, but the unfiltered AOI device location data 220. In other embodiments, the boundaries of the proximity zone 212 may be determined as a neighborhood, zone, city, or region (defined by local authorities) in which the AOI 205 is situated. The proximity zone 212 may also be defined by the requestor instead.

After determining the proximity zone, the proximity zone identifier 210 sends the definition of the proximity zone 212 to the device location selector 215.

The device location selector 215 determines the devices that are within the boundaries of the AOI 205 and the proximity zone 212. To determine the number of devices within each boundary, the device location selector 215 identifies entries in the location data store 132 for device that report locations which are within the boundaries of the AOI 205 or proximity zone 212 and which have timestamps which are within a specified time interval. The device location selector 215 may determine that a reported location is within a boundary using the geographic data store 134 to determine the location of the boundaries relative to the reported location (e.g., using some boundary test such as the crossing number algorithm).

The specified time interval may be indicated by the requestor, or may be preset or set to a default value. The time interval may be set to a time scale based on the type of changes that a requestor wishes to detect. For example, some changes occur hour by hour. In such a case, the time interval may be set to one hour. Other longer-term changes may be visible over many months, and thus the time interval may be set to a single month. The device location selector 215 may also determine the devices within the AOI 205 and the proximity zone 212 for multiple time intervals, beginning, for example, with a time interval coinciding with the current time, and moving back in time for a certain number of time intervals.

Once the device location selector 215 determines the device entries in the location data store 132 that have reported locations within the AOI 205 and the proximity zone 212 for the various time intervals, the device location selector 215 outputs the device entries as the AOI device location data 220 for the AOI 205 and the zone device location data 225 for the proximity zone 212.

The device location data filter 230 receives the AOI device location data 220 and the zone device location data 225 from the device location selector 215 and filters out those entries which match certain characteristics from these two data sets. The device location data filter 230 includes one or more filters which are applied to the AOI device location data 220 or the zone device location data 225 to remove these matching entries. In the description below, references to the AOI 205 correspond to the AOI device location data 220, and references to the proximity zone correspond to zone device location data 225.

In one embodiment, the device location data filter 230 filters out entries which do not exceed the characteristic of a certain dwell time (which may be specified by the requestor). The dwell time defines a period of time (e.g., 10 minutes). The device location data filter 230 analyzes the AOI device location data 220 or the zone device location data 225 to identify unique devices within the data using device identifier values. The device location data filter 230 determines, for each of these devices, an amount of continuous time during which the device reports a location within the AOI 205 or the proximity zone 212. If that amount of continuous time is below the dwell time, the device location data filter 230 removes from consideration all such entries for that device from the AOI device location data 220 or the zone device location data 225, respectively. If the entries in the device location data filter 230 include entries for the same device which are discontinuous in time, the device location data filter 230 may group entries which form the different continuous time periods and determine if each one of these exceeds the dwell time. If not, the entries associated with the disqualifying continuous time period are discarded. The device location data filter 230 may determine that a group of entries is part of the same continuous time period if each entry in the group has a timestamp that is within a certain threshold time of a timestamp of at least another entry in the group. The device location data filter 230 may separate entries into one or more groups when the entries between two groups have timestamps which are not within the threshold time of each other.

In another embodiment, the device location data filter 230 filters out entries that have timestamps that do not match a characteristic of a specified repeating time period, such as a time period in day, day of the week, week of the month, etc. If the timestamp of an entry does not fall within the specified time period, which may repeat, then that entry is removed. Other entries for the same device within the same continuous time period may also be discarded. The specified repeating time period may be set by the requestor, or may be based on the type of the AOI in the case where entries are removed from the AOI device location data 220. For example, if the AOI is a customer facing business, the repeating time period may specific typical store open hours. If the AOI is an office location, the repeating time period may specify regular business hours.

In another embodiment, the device location data filter 230 may also filter out other erroneous data, such as duplicate entries and devices that have a speed exceeding a certain threshold. For example, duplicate entries may be removed where two devices having the same device identifier report the same location, or report two different locations which are within a threshold distance of each other (e.g., 1 meter). As another example, the device location data filter 230 may analyze the various location entries to find two sets of entries, each set having a different device identifier, but both having the same reported locations (or reported locations within a threshold distance of each other) that are reported over the same or approximately the same time periods. The device location data filter 230 may remove one of these sets of location entries in such a case, as these entries may represent the same device, reported by a different device location data provider, with each using a different device identifier.

After filtering the AOI device location 220 and the zone device location data 225, the device location data filter 230 outputs the filtered AOI device location data 235 and the filtered zone device location data 226, respectively.

The AOI data normalizer 240 receives the filtered AOI device location data 235 and normalizes this data using the filtered zone device location data 226. The purpose of normalizing data, as noted above, is to account for systemic changes in the device location data that has been received by the AOI user analyzer system 130 at the location data store 132. In the case where the device location data includes an increase or decrease in the global number of devices that are reporting location data, this change should not affect the estimate of the number of users at the AOI. Therefore, the AOI data normalizer 240 compares the number of devices reported in the filtered zone device location data 226 and the filtered AOI device location data 235 to determine if any changes in the reported number of devices at the AOI 205 during a particular time interval is due to an actual change in the AOI or due to a systemic change in the reported data. If there is a systemic change in the data, this change should be reflected in both the reported devices from the AOI 205 as well as from the proximity zone 212. However, if the change is only due to a change in visits/movement at the AOI 205, then there should be no major changes to the number of users reported in the entire proximity zone 212.

Thus, the AOI data normalizer 240 may divide the number of unique devices reporting a location in the time interval in the filtered AOI device location data 235, by the number of unique devices reporting a location in the same time interval but in the proximity zone 212 (i.e., for the filtered zone device location data 226). To determine this number of devices for the filtered AOI device location data 235, the AOI data normalizer 240 determines those entries in the filtered AOI device location data 235 that are within a specified time interval (e.g., the time interval described above for the device location selector 215). Within these entries, the AOI data normalizer 240 removes any duplicate entries that have duplicate device identifiers. The remaining entries are counted to determine the number of unique devices that were present at the AOI 205 during the specified time interval. The AOI data normalizer 240 may determine this value for multiple time intervals, depending on the time intervals that are available in the location data 235. The AOI data normalizer 240 performs the same operation for the filtered zone device location data 226. The time intervals selected for the filtered zone device location data 226 should match those used for the AOI device location data 235. For each time interval, the AOI data normalizer 240 divides the number of unique devices determined from the AOI location data 235 by the number of unique devices determined from the zone location data 225, to generate a ratio. This ratio removes the effects of any systematic changes to the number of reported devices, as it will not change if unique devices at the AOI and proximity zone both change at the same time. However, if the change is only at the AOI 205, the ratio value will change, and this indicates that a number of users at the AOI 205 has changed from a previous estimate.

The AOI data normalizer 240 uses this computed ratio and applies it to demographic data for the proximity zone. This demographic data may be accessed from a third party, such as a third party population estimation service or from government census data. This demographic data estimates a number of total users which are in the proximity zone 212. By applying (e.g., multiplying) the ratio against this number of total users, the AOI data normalizer 240 can generate an estimate 245 of a number of users that are within the AOI for a given time interval. If the ratio does not change from a prior computation, the estimate of the number of users will remain the same. However, if the ratio changes, the estimate of the number of users changes as well. By charting multiple AOI user estimates 245 for multiple time intervals, the AOI data normalizer 240 can further generate a report indicating the AOI user estimate 245 over time. Alternatively, the AOI data normalizer 240 may present the ratio value directly for each time interval in the report in addition to or instead of presenting the AOI user estimate 245.

The report may be presented via a GUI, such as a web interface in a browser, to a requestor who requested the data for a specific AOI 205. The report may also be presented via some API and integrated into the data systems of a third party for making automated decisions. In addition, the report may be stored in the geographic data store 134 for the AOI to serve as the basis of historical data analysis, e.g., by the anomaly detector 250.

In some embodiments, the AOI user analyzer 136 performs additional analysis on the various data that is generated. The AOI user analyzer 136 may include an anomaly detector 255, a relative data analyzer 255, and a revisit analyzer 260.

The anomaly detector 255 detects variations in the AOI user estimates 245 over different repeating time periods to determine whether a variation exists in the estimate that exceeds a confidence interval (or prediction interval) that is computed using historical data. If the confidence interval is exceeded, the anomaly detector 255 may transmit a message to the requestor (e.g., in the aforementioned report) indicating this "anomaly." Such an anomaly may indicate an issue at the AOI, such as a production concern, decreased sales, etc.

To detect an anomaly, the anomaly detector 255 may first determine a baseline from which to measure deviations. This baseline may be generated based on historical data (e.g., which may be retrieved from the geographic data store 134). The anomaly detector 255 analyzes historical data (e.g., past 90 days) for the AOI 205 to determine an average, mean, or "normal" AOI user estimate 245 (or ratio) for a particular repeating time period. In one embodiment, the anomaly detector 255 may train a machine learning model for an AOI for which analysis is desired. The model may be an autocorrelation function, i.e., the correlation of the estimate with a delayed version of the estimate. Here, the delayed version may be the prior estimates for the same repeating time period. Thus, the anomaly detector 255 may correlate a current estimate with a prior estimate for the same time period (e.g., the same time of day). If the autocorrelation result is below a certain value (e.g., 0.1), this indicates that the estimates are not highly correlated and may indicate an anomaly. The anomaly detector 255 may transmit this in a message to the requestor or may include this in the report. The report may indicate which time period has the anomaly, and may indicate the amount of deviation, e.g., by reporting the correlation value, etc.

In another embodiment, the anomaly detector 255 determines that an anomaly is present by computing the median value of the AOI user estimate 245 (or ratio value) for previous repeating time periods (e.g., weekends or weekdays). The anomaly detector 255 determines this median value as the 50% percentile, and computes the 10%-90% confidence band (or other confidence band amount) around this median value by computing a distribution and determining where 40% of the historical estimates on each side of the median value reside. If any AOI user estimate 245 falls outside this confidence band, then the anomaly detector 255 may transmit a message indicating that an anomaly exists, or may include the information of the message in the report. The message may indicate the time period in which the anomaly exists, and may indicate the percentile of the estimated users for that anomaly. The anomaly detector 255 allows a requestor to determine if any sudden changes occur with the number of users visiting a particular AOI.

The relative data analyzer 255 analyzes the AOI user estimate 245 and compares it against AOI user estimates of alternate AOIs. These alternate AOIs are AOIs which can be the same category or type as the target AOI 205. For example, the alternate AOI may be an AOI of the same type from a competitor, or another location of the same type for the same company (e.g., another retail location). This information about various AOIs may be stored in, and retrieved from, the geographic data store 134. The relative data analyzer 255 analyzes the differences over time of the AOI user estimates for the target AOI 205 and for one or more alternate AOIs. These differences may also be reported to the requestor. This allows the requestor to determine how the target AOI 205 compares to other AOIs associated with the requestor or to competitors.

The revisit analyzer 260 determines whether any individual devices have re-visited the AOI 205 over two different time periods that are discontinuous from each other. As described above with regards to the device location data filter 230, two groups of reported location entries may be discontinuous in time from each other when their timestamps are separated by a threshold time period. The relative data analyzer 255 counts a number of these groups of reported location entries for each of the devices that have visited the AOI 205 over a time range. The relative data analyzer 255 may then report, for each revisit number, the number of unique devices that have revisited the AOI that number of times. This information may be transmitted in the aforementioned report or separately to the requestor. This information lets the requestor know, for example, the number of repeat customers at a retail location, or the number of employees versus temporary visitors to an office or facility.

Example Graph of AOI User Estimates for a Graphical Interface

Figure 3A:
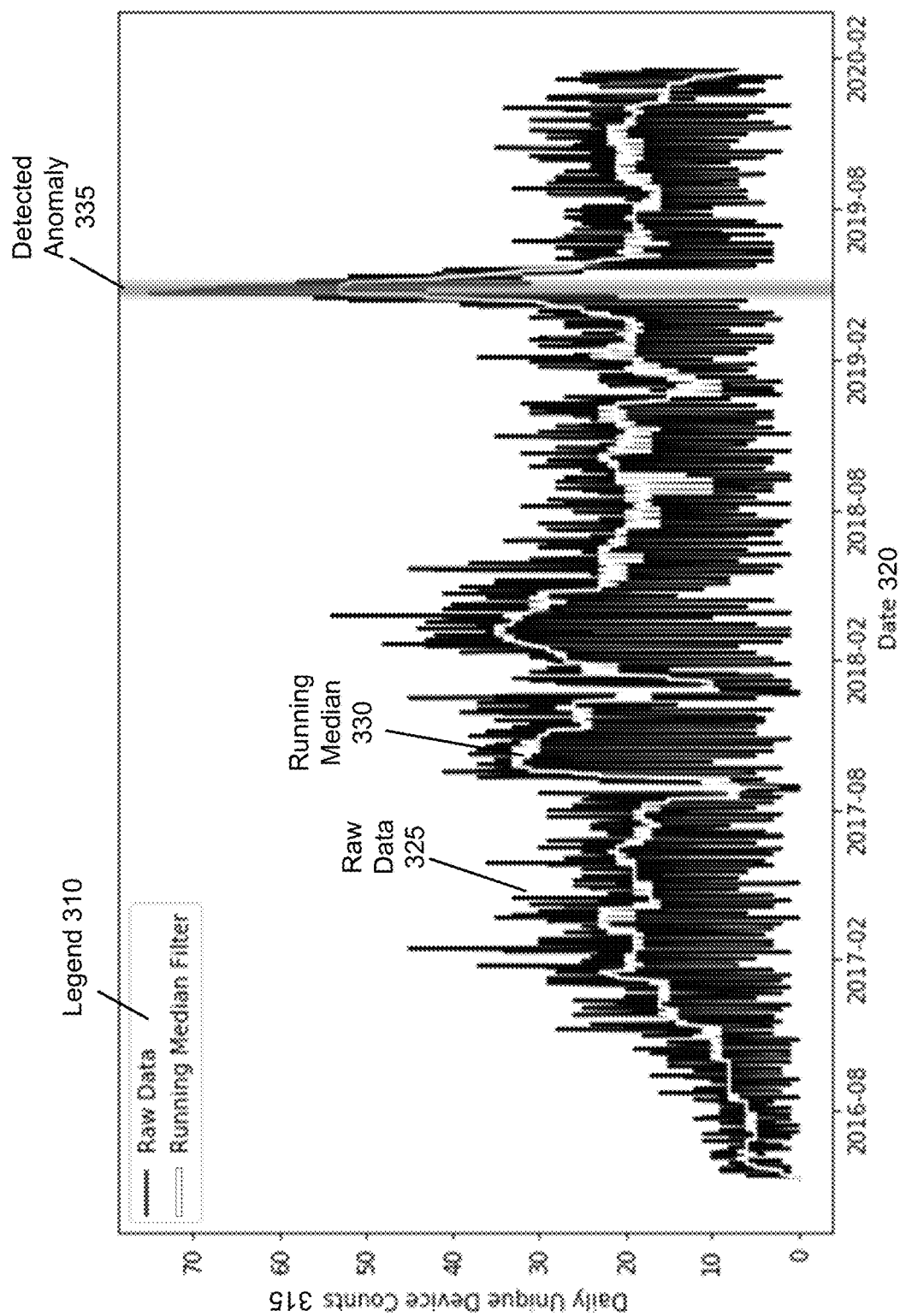
FIG. 3A illustrates an example of an estimate of a number of users at an AOI as provided in a graph form in a graphical interface to a requestor, in accordance with an embodiment.

FIG. 3A illustrates an example of an estimate of a number of users at an AOI as provided in a graph form in a graphical interface to a requestor, in accordance with an embodiment. The graph in FIG. 3A plots a daily unique device counts 315 against time/date 320. As described above with reference to FIGS. 1-2, the daily unique device counts 315 may be an estimate of a number of users at an AOI, computed after filtering and normalizing the AOI device location data for the AOI. Here, the time interval is one day. As shown in the legend 310, the graph includes a plot of the raw data 325, indicating the estimate of users or device counts for each day. Furthermore, as shown in the legend 310 the graph includes a running median filter. This may be the same as the median value generated by the anomaly detector 250 as described above with reference to FIG. 2. Here, the median filter represents a line that shows the median value generated from the median of the daily unique device counts 315 for a period of time, e.g., 60 days, from the current time. In addition, the graph shows a detected anomaly 335. This is a point in time in which the raw data 325 exceeds the running median 330 for a previous time interval by over a threshold amount. The anomaly is indicated here by highlighting the time intervals in which the raw data exceeds the threshold.

Example Chart of Device Location Data

FIG. 3B illustrates an example of data that may be collected by the AOI user analyzer system and provided to a requestor for an AOI, in accordance with an embodiment. The data shown here may be data that is stored in the location data store 132. While it is normally used to generate the AOI user estimates 245, it may also be transmitted in the aforementioned report in some embodiments.

The device location data includes multiple entries. Each entry includes a timestamp 340, device identifier (ID) 345, operating system (OS) ID 350, geo hash 355, geographic coordinates 360, accuracy level 365, and application ID 370.

The timestamp 340 indicates a timestamp at which the device location data entry was reported by a location enabled device. This timestamp 340 is used when determining whether an entry is within a particular time interval.

The device ID 345 identifies each individual unique device. This allows the system to determine the identity of individual devices in order to perform tasks such as filtering out devices which do not meet dwell time requirements, to determine revisit rates, to count the number of unique devices in a time interval, and so on. Each device ID may be a globally unique identifier (GUID).

The OS ID 350 indicates an operating system of the device that reported the location for the location entry. Each operating system may be indicated using a four letter code.

The geo hash 355 is a unique identifier for the reported location provided by the device. The geo hash 355 may be a geographic encoding for a specific location, represented using a string of alphanumeric characters, and may represent a set of geographic coordinates to a certain degree of accuracy.

The geographic coordinates 360 are latitude and longitude coordinates which have been reported by the device. These are accompanied by an accuracy measure 365, which indicates the accuracy of the geographic coordinates 360 in distance (e.g., 16 ft accuracy).

Each location entry also includes an app/provider ID 370. This may indicate the application on the device which collected the location information, or a provider which provided the location information to the system. This may also be a GUID.

Example Flow

Figure 4:
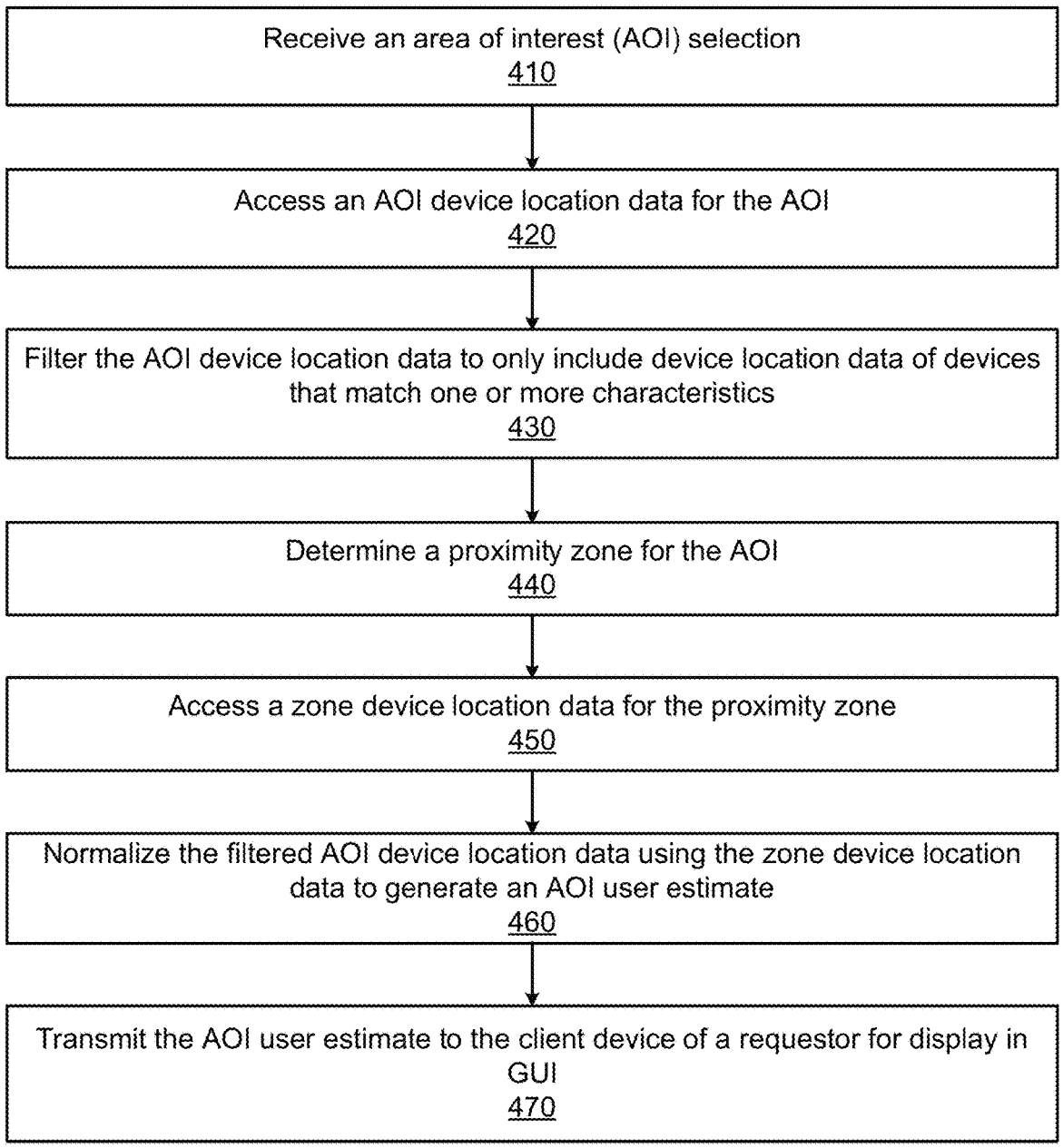
FIG. 4 is a flow diagram illustrating estimation of a number of users in an AOI using the AOI user analyzer system, in accordance with an embodiment.

FIG. 4 is a flow diagram illustrating estimation of a number of users in an AOI using the AOI user analyzer system, in accordance with an embodiment.

In some example embodiments, the process may have different and/or additional steps than those described in conjunction with FIG. 4. Steps of the process may be performed in different orders than the order described in conjunction with FIG. 4. Some steps may be executed in parallel. Alternatively, some of the steps may be executed in parallel and some steps executed sequentially. Alternatively, some steps may execute in a pipelined fashion such that execution of a step is started before the execution of a previous step. In one embodiment, the process is performed by the AOI user analyzer system 130.

The AOI user analyzer system 130 receives 410 an area of interest (AOI) selection. After receiving this selection, the AOI user analyzer system 130 accesses 420 an AOI device location data for the AOI. The AOI user analyzer system 130 filters 430 the AOI device location data to only include device location data of devices that match one or more characteristics, such as a dwell time or time of day requirement as noted above. The AOI user analyzer system 130 determines 440 a proximity zone for the AOI, such as the proximity zone 114. The AOI user analyzer system 130 accesses 450 a zone device location data for the proximity zone. This, as noted above, indicates device location data for devices within the proximity zone for a specified time period. The AOI user analyzer system 130 normalizes 460 the filtered AOI device location data using the zone device location data to generate the AOI user estimate. This may be generated by determining a ratio between the filtered AOI device location data and the zone device location data as described above. The AOI user analyzer system 130 transmits 470 this AOI user estimate to a client device of a requestor for display in a GUI on a display device of the client device of the requestor.

Example Machine Architecture

Figure 5:
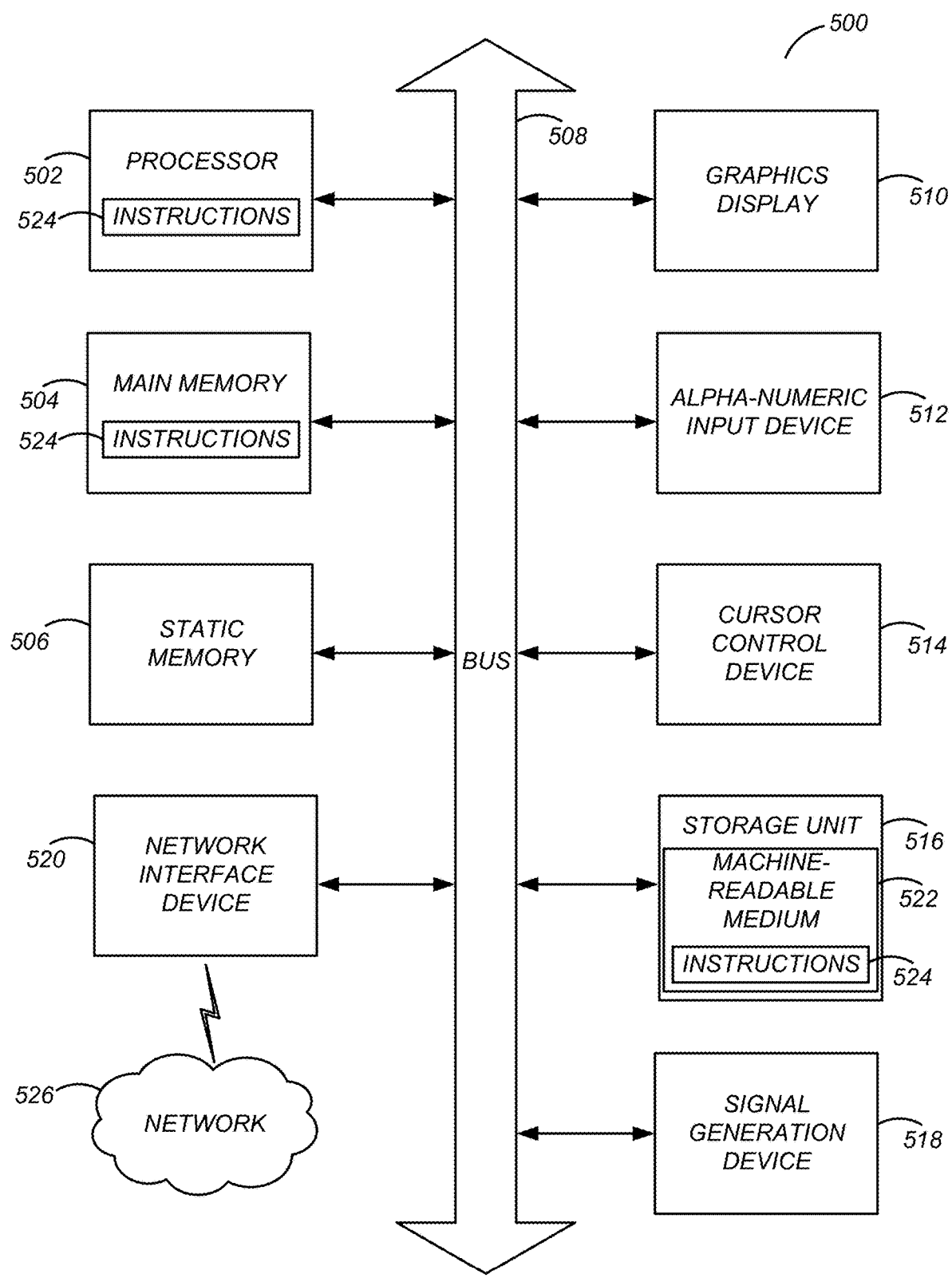
FIG. 5 is a block diagram illustrating components of an example machine able to read instructions from a machine-readable medium and execute them in a processor or controller.

FIG. 5 is a block diagram illustrating components of an example machine able to read instructions described as processes herein from a machine-readable medium and execute them in at least one processor (or controller). Specifically, FIG. 5 shows a diagrammatic representation of a machine in the example form of a computer system 500. The computer system 500 can be used to execute instructions 524 (e.g., program code or software) for causing the machine to perform any one or more of the methodologies (or processes) described herein. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment. It is noted the instructions correspond to the functionality of components and/or processes described herein, for example, with respect to FIGS. 1-4.

The machine may be a server computer, a client computer, a personal computer (PC), a tablet PC, a set-top box (STB), a smartphone, an internet of things (IoT) appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes one or more processing units (generally processor 502). The processor 502 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. The computer system 500 also includes a main memory 504. The computer system may include a storage unit 516. The processor 502, memory 504 and the storage unit 516 communicate via a bus 508.

In addition, the computer system 500 can include a static memory 506, a display driver 510 (e.g., to drive a plasma display panel (PDP), a liquid crystal display (LCD), or a projector). The computer system 500 may also include alphanumeric input device 512 (e.g., a keyboard), a cursor control device 514 (e.g., a mouse, a trackball, a joystick, a motion sensor, or other pointing instrument), a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. The instructions 524 may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 may be transmitted or received over a network 526 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store the instructions 524. The term "machine-readable medium" shall also be taken to include any medium that is capable of storing instructions 524 for execution by the machine and that cause the machine to perform any one or more of the methodologies disclosed herein. The term "machine-readable medium" includes, but not be limited to, data repositories in the form of solid-state memories, optical media, and magnetic media. It is noted that in some example embodiments, the core components of the computer system may disregard components except for the processor 502, memory 504, and bus 508 and may in other embodiments also include the storage unit 516 and/or the network interface device 520.

ADDITIONAL CONSIDERATIONS

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated and described with FIGS. 1-4. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (e.g., as a special-purpose processor, such as a field programmable gate array (FPGA) or an application-specific integrated circuit (ASIC)) to perform certain operations. A hardware module may also include programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 502, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, include processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that includes a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the claimed invention. This description should be read to include one or at least one and the singular also includes the plural unless it is obvious that it is meant otherwise.

Upon reading this disclosure, those of skill in the art will appreciate still additional alternative structural and functional designs for a system to estimate a number of users at an area of interest. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A non-transitory computer readable storage medium comprising stored instructions encoded thereon that, when executed by at one or more processors cause the processors to:
   receive an area of interest (AOI) selection, the selection indicating a geographic area;
   access an AOI device location data for the AOI during a current time period, the AOI device location data indicating locations of one or more devices over time received within the AOI, wherein the current time period corresponds to a selected repeating time period;
   filter the AOI device location data to only include device location data that match one or more first characteristics;
   determine a proximity zone for the AOI, the proximity zone being a superset of the AOI; accessing a zone device location data for the proximity zone, the zone device location data indicating locations of one or more devices over time reported within the proximity zone;
   filter the proximity zone device location data to only include device location data that matches one or more second characteristics;
   normalize the filtered AOI device location data by computing a ratio of the filtered AOI device location data and the zone device location data to generate a current AOI user estimate for the current time period;
   determine a prediction interval for AOI user estimates for a plurality of repeating time periods using historical AOI user estimates;
   determine whether the current AOI user estimate exceeds the prediction interval to a specified degree for the historical AOI user estimate for the selected repeating time period; and
   transmit a message to a client device of a requestor to cause an alert to be displayed at a graphical user interface of the client device of the requestor in response to the current AOI user estimate exceeding a percentile range for the historical AOI user estimate for the selected repeating time period.

2. The non-transitory computer readable storage medium of claim 1, wherein the selection of the AOI is indicated using a closed polygonal boundary, the closed polygonal boundary specified using geographic coordinates.

3. The non-transitory computer readable storage medium of claim 1, wherein instructions to filter the AOI device location data further comprise stored instructions that when executed cause the processors to:
   filter the AOI device location data to only include device location data of devices that are at the AOI during a specified time period.

4. The non-transitory computer readable storage medium of claim 1, wherein instructions to filter the AOI device location data further comprise stored instructions that when executed cause the processors to:
   filter the AOI device location data to only include device location data of devices that are are the AOI for a range of dwell times.

5. The non-transitory computer readable storage medium of claim 1, wherein instructions to determine the proximity zone further comprise stored instructions that when executed cause the processors to:
   select a region having a center matching that of the AOI, the region having each dimension exceeding 100 kilometers.

6. The non-transitory computer readable storage medium of claim 1, wherein instructions to determine the proximity zone further comprise stored instructions that when executed cause the processors to:
   determine a home location of devices of the AOI device location data; and
   determine the proximity zone to include regions having the home locations of the devices of the AOI device location data which are within a predetermined threshold distance from the AOI.

7. The non-transitory computer readable storage medium of claim 1, wherein instructions to normalize the filtered AOI device location data further comprise stored instructions that when executed cause the processors to:
   computing a ratio of a number of devices reported in the filtered AOI device location data and the zone device location data; and
   determining an AOI user estimate based on a number of users in the proximity zone as indicated by demographic data modified by the computed ratio.

8. The non-transitory computer readable storage medium of claim 1, further comprising stored instructions that when executed cause the processors to:
   determine a relative difference between the AOI user estimate and a AOI user estimate of one or more alternate AOIs that share a same category type as the AOI; and
   transmit a message to the client device of the requestor to cause the relative difference displayed within the GUI of the client device of the requestor.

9. The non-transitory computer readable storage medium of claim 1, further comprising stored instructions that when executed cause the processors to:
  determine a number of re-visits of devices based on the filtered AOI device location data, a re-visit being a device in the filtered AOI device location data with a device location history that has a location that is within the AOI during more than one non-consecutive time period; and
  transmit a message to the client device of the requestor to cause the number of re-visits to be displayed within the GUI of the client device of the requestor.

10. A non-transitory computer readable storage medium comprising stored instructions encoded thereon that, when executed by at one or more processors cause the processors to:
  receive an area of interest (AOI) selection, the selection indicating a geographic area;
  access an AOI device location data for the AOI, the AOI device location data indicating locations of one or more devices over time received within the AOI;
  filter the AOI device location data to only include device location data that match one or more first characteristics;
  determine a proximity zone for the AOI, the proximity zone being a superset of the AOI;
  access a zone device location data for the proximity zone, the zone device location data indicating locations of one or more devices over time reported within the proximity zone;
  filter the proximity zone device location data to only include device location data that matches one or more second characteristics;
  determine a number of re-visits of devices based on the filtered AOI device location data, wherein a re-visit represents a device in the filtered AOI device location data with a device location history comprising a location within the AOI during more than one non-consecutive time periods; and
  transmit a message to a client device of a requestor to cause the number of re-visits for display in a graphical user interface on a screen associated with the client device of the requestor.

11. The non-transitory computer readable storage medium of claim 10, wherein the selection of the AOI is indicated using a closed polygonal boundary, the closed polygonal boundary specified using geographic coordinates.

12. The non-transitory computer readable storage medium of claim 10, wherein instructions to filter the AOI device location data further comprise stored instructions that when executed cause the processors to:
  filter the AOI device location data to only include device location data of devices that are at the AOI during a specified time period.

13. The non-transitory computer readable storage medium of claim 10, wherein instructions to filter the AOI device location data further comprise stored instructions that when executed cause the processors to:
  filter the AOI device location data to only include device location data of devices that are are the AOI for a range of dwell times.

14. The non-transitory computer readable storage medium of claim 10, wherein instructions to determine the proximity zone further comprise stored instructions that when executed cause the processors to:
  select a region having a center matching that of the AOI, the region having each dimension exceeding 100 kilometers.

15. The non-transitory computer readable storage medium of claim 10, wherein instructions to determine the proximity zone further comprise stored instructions that when executed cause the processors to:
  determine a home location of devices of the AOI device location data; and
  determine the proximity zone to include regions having the home locations of the devices of the AOI device location data which are within a predetermined threshold distance from the AOI.

16. The non-transitory computer readable storage medium of claim 10, further comprising stored instructions that when executed cause the processors to:
  determine, using historical AOI user estimates, a prediction interval for the AOI user estimates in the historical AOI user estimates for a plurality of repeating time periods;
  determine a selected repeating time period in which a current time period belongs;
  determine whether a current AOI user estimate exceeds the prediction interval to a specified degree for the historical AOI user estimate for the selected repeating time period;
  transmit, in response to the current AOI user estimate exceeding a percentile range for the historical AOI user estimate for the selected repeating time period, a message to the client device of the requestor to cause an alert to be displayed at the GUI of the client device of the requestor.

17. The non-transitory computer readable storage medium of claim 10, wherein instructions to normalize the filtered AOI device location data further comprise stored instructions that when executed cause the processors to:
  computing a ratio of a number of devices reported in the filtered AOI device location data and the zone device location data; and
  determining an AOI user estimate based on a number of users in the proximity zone as indicated by demographic data modified by the computed ratio.

18. The non-transitory computer readable storage medium of claim 10, further comprising stored instructions that when executed cause the processors to:
  determine a relative difference between the AOI user estimate and a AOI user estimate of one or more alternate AOIs that share a same category type as the AOI; and
  transmit a message to the client device of the requestor to cause the relative difference displayed within the GUI of the client device of the requestor.

19. A system comprising:
  one or more processors; and
  a non-transitory computer readable storage medium comprising stored instructions encoded thereon that, when executed by at one or more processors cause the processors to:
    receive an area of interest (AOI) selection, the selection indicating a geographic area;
    access an AOI device location data for the AOI during a current time period, the AOI device location data indicating locations of one or more devices over time received within the AOI, wherein the current time period corresponds to a selected repeating time period;

filter the AOI device location data to only include device location data that match one or more first characteristics;
determine a proximity zone for the AOI, the proximity zone being a superset of the AOI; accessing a zone device location data for the proximity zone, the zone device location data indicating locations of one or more devices over time reported within the proximity zone;
filter the proximity zone device location data to only include device location data that matches one or more second characteristics;
normalize the filtered AOI device location data by computing a ratio of the filtered AOI device location data and the zone device location data to generate a current AOI user estimate for the current time period;
determine a prediction interval for AOI user estimates for a plurality of repeating time periods using historical AOI user estimates;
determine whether the current AOI user estimate exceeds the prediction interval to a specified degree for the historical AOI user estimate for the selected repeating time period; and
transmit a message to a client device of a requestor to cause an alert to be displayed at a graphical user interface of the client device of the requestor in response to the current AOI user estimate exceeding a percentile range for the historical AOI user estimate for the selected repeating time period.

20. A system comprising:
one or more processors; and
a non-transitory computer readable storage medium comprising stored instructions encoded thereon that, when executed by at one or more processors cause the processors to:
receive an area of interest (AOI) selection, the selection indicating a geographic area;
access an AOI device location data for the AOI, the AOI device location data indicating locations of one or more devices over time received within the AOI;
filter the AOI device location data to only include device location data that match one or more first characteristics;
determine a proximity zone for the AOI, the proximity zone being a superset of the AOI;
access a zone device location data for the proximity zone, the zone device location data indicating locations of one or more devices over time reported within the proximity zone;
filter the proximity zone device location data to only include device location data that matches one or more second characteristics;
determine a number of re-visits of devices based on the filtered AOI device location data, wherein a re-visit represents a device in the filtered AOI device location data with a device location history comprising a location within the AOI during more than one non-consecutive time periods; and
transmit a message to a client device of a requestor to cause the number of re-visits for display in a graphical user interface on a screen associated with the client device of the requestor.

21. A method comprising:
receiving an area of interest (AOI) selection, the selection indicating a geographic area;
accessing an AOI device location data for the AOI during a current time period, the AOI device location data indicating locations of one or more devices over time received within the AOI, wherein the current time period corresponds to a selected repeating time period;
filtering the AOI device location data to only include device location data that match one or more first characteristics;
determining a proximity zone for the AOI, the proximity zone being a superset of the AOI; accessing a zone device location data for the proximity zone, the zone device location data indicating locations of one or more devices over time reported within the proximity zone;
filtering the proximity zone device location data to only include device location data that matches one or more second characteristics;
normalizing the filtered AOI device location data by computing a ratio of the filtered AOI device location data and the zone device location data to generate a current AOI user estimate for the current time period;
determining a prediction interval for AOI user estimates for a plurality of repeating time periods using historical AOI user estimates;
determining whether the current AOI user estimate exceeds the prediction interval to a specified degree for the historical AOI user estimate for the selected repeating time period; and
transmitting a message to a client device of a requestor to cause an alert to be displayed at a graphical user interface of the client device of the requestor in response to the current AOI user estimate exceeding a percentile range for the historical AOI user estimate for the selected repeating time period.

22. A method comprising:
receiving an area of interest (AOI) selection, the selection indicating a geographic area;
accessing an AOI device location data for the AOI, the AOI device location data indicating locations of one or more devices over time received within the AOI;
filtering the AOI device location data to only include device location data that match one or more first characteristics;
determining a proximity zone for the AOI, the proximity zone being a superset of the AOI;
accessing a zone device location data for the proximity zone, the zone device location data indicating locations of one or more devices over time reported within the proximity zone;
filtering the proximity zone device location data to only include device location data that matches one or more second characteristics;
determining a number of re-visits of devices based on the filtered AOI device location data, wherein a re-visit represents a device in the filtered AOI device location data with a device location history comprising a location within the AOI during more than one non-consecutive time periods; and
transmitting a message to a client device of a requestor to cause the number of re-visits for display in a graphical user interface on a screen associated with the client device of the requestor.

* * * * *